US008479639B2

(12) United States Patent
Levin

(10) Patent No.: US 8,479,639 B2
(45) Date of Patent: Jul. 9, 2013

(54) BEVERAGE PREPARATION DEVICE AND SYSTEM

(76) Inventor: Shalom Levin, Atlit (IL)

( * ) Notice: Subject to any disclaimer, the term of this patent is extended or adjusted under 35 U.S.C. 154(b) by 552 days.

(21) Appl. No.: 12/528,324

(22) PCT Filed: Feb. 25, 2008

(86) PCT No.: PCT/IL2008/000239
§ 371 (c)(1),
(2), (4) Date: Aug. 23, 2009

(87) PCT Pub. No.: WO2008/104971
PCT Pub. Date: Sep. 4, 2008

(65) Prior Publication Data
US 2010/0112166 A1    May 6, 2010

Related U.S. Application Data

(60) Provisional application No. 60/891,950, filed on Feb. 28, 2007.

(51) Int. Cl.
*A47J 31/00* (2006.01)
(52) U.S. Cl.
USPC ............ 99/295; 99/302 R; 99/323.3; 426/433
(58) Field of Classification Search
USPC ...................... 426/433; 99/295, 302 R, 323.3
See application file for complete search history.

(56) References Cited

U.S. PATENT DOCUMENTS

| 2,715,868 A | 8/1955 | Brown |
| 4,167,899 A | 9/1979 | McCormick |
| 4,452,130 A | 6/1984 | Klein |
| 4,738,378 A | 4/1988 | Oakley |
| 5,300,308 A | 4/1994 | Louridas |
| 5,771,788 A | 6/1998 | Lee et al. |
| 5,772,017 A | 6/1998 | Kang |
| 6,055,401 A * | 4/2000 | Tonomoto et al. ............ 399/269 |
| 6,059,145 A * | 5/2000 | Stratton et al. ................. 222/78 |
| 6,172,340 B1 | 1/2001 | Chang |
| 6,372,270 B1 | 4/2002 | Denny |
| 6,443,050 B2 | 9/2002 | Timm |
| 6,517,878 B2 | 2/2003 | Heczko |
| 6,619,188 B1 | 9/2003 | Meador |
| 6,766,106 B2 | 7/2004 | Roberson |
| 7,552,673 B2 * | 6/2009 | Levin ......................... 99/323.3 |
| 7,555,979 B2 * | 7/2009 | Shultis .......................... 99/275 |

FOREIGN PATENT DOCUMENTS

| GB | 2291180 | 1/1996 |
| WO | WO 97/47931 | 12/1997 |
| WO | WO 01/25099 | 4/2001 |

* cited by examiner

*Primary Examiner* — Anthony Weier
(74) *Attorney, Agent, or Firm* — Law Offices of Edward Langer Adv. and Patent Attorney

(57) ABSTRACT

A beverage preparation system, a method of preparation and a device for securely engaging with a cup unit for preparing a beverage. A potable liquid is supplied within the cup unit but kept separate from a capsule brewing element containing a predetermined quantity of edible ingredients also disposed within the cup unit. The brewing element is constructed in a shape which retains its integrity without any external support even under pressure such as needed for espresso drink preparation. The beverage preparation device operates by extracting the potable liquid from the cup unit, processing it in a heating/cooling chamber, and returning the processed liquid at a predetermined pressure and time duration to the cup unit. The operation is performed in accordance with preprogrammed instructions associated with an instruction source provided on a sealed cover of the cup unit.

15 Claims, 9 Drawing Sheets

BEVERAGE PREPARATION DEVICE AND SYSTEM

CROSS-REFERENCE TO RELATED APPLICATIONS

The present Application is based on International Application No. PCT/IL2008/00239 filed on Feb. 25, 2008, which is based on U.S. Provision Application No. 60/891,950 filed on Feb. 28, 2007.

FIELD OF THE INVENTION

The present invention is related to the field of beverage preparation devices and systems, and in particular, to a beverage preparation device and system for making brews, mixes, and potions on demand by selectively introducing and mixing predetermined quantities of stored, beverage preparations into a portable beverage container containing a predetermined volume of a potable liquid.

BACKGROUND OF THE INVENTION

People enjoy drinking cold and hot beverages at all times, especially while on the go. Coffee, tea, and other hot drinks of all types are very popular all year around. Children and babies enjoy cold or hot milk, often with a chocolate or other flavor added. In the morning, many adults prefer hot drinks such as coffee.

In order to have coffee for his morning commute, a person either has to be up early to prepare the coffee in his home, or prepare it the night before and keep it hot in a thermos type container. As society becomes increasingly mobile, the morning routine is disturbed and a person either goes without a morning drink or must wait until he or she is at school or work to prepare a favorite beverage, if there is time. Instant hot teas and soups require heating facilities, whether at the office or at home and cannot easily be prepared in a car. Thermos bottles filled with coffee prepared the night before may supply the need for a drink, but such coffee is usually not very hot and not as tasty as it was when freshly brewed.

People now enjoy more varied coffee drinks in the morning, such as espressos, lattes, cappuccinos, and the like. Espresso must be consumed while fresh, and at a high temperature, to preserve its quality and taste. The preparation of an espresso or espresso-based drink before the morning commute or other trip typically requires additional preparation time.

Vehicles today usually come equipped with various types of cup holders for travelers who like to have a hot or cold drink, whether home-made or bought "on the run." These holders usually comprise dual cup trays built into the dashboard and pulled down or otherwise extended for use, or cup wells formed in the spaces between adjoining seats, or mounted on trays attached to the backs of the front seats for use by passengers seated in the rear.

Most installations for holding cups, particularly those for use in vehicles, are based on either a small round tray or a ring for nesting a cup and holding it upright, or a pair of extensions which hug the cup much as a human hand would. The prior art cup holders do not "lock" the cup in place, but only provide a storage space for resting the cup so that it is out of the way while the vehicle is in motion, freeing the hands of the driver.

Thus, it is desirable to provide a broad variety of ready-to-make beverages which can be served either cold or hot, and can be freshly made with minimum effort, according to the taste and preference of the consumer, and at a reasonable cost.

SUMMARY OF THE INVENTION

Accordingly, it is a principal object of the present invention to overcome the problems associated with beverage preparation and to provide a beverage preparation device (hereinafter sometimes referred to as an "espresso point device"), and also a system and a method for preparing both hot brewed beverages, such as espresso coffee, and cold mixed drinks.

Thus, the present invention provides a beverage preparation device enclosed in a housing formed with a receiving chamber partially surrounding a holding tray for accommodating a cup unit, said beverage preparation device comprising:
  means for extracting a potable liquid from the cup unit;
  means for processing the potable liquid; and
  means for returning the potable liquid into the cup unit,
such that when the cup unit is placed on the holding tray disposed within the receiving chamber and the beverage preparation device is connected to a power source and operated, the extracting means connected to the cup unit extracts a potable liquid therefrom for processing by the processing means, and the returning means connected to the cup unit and processing means returns the potable liquid into the cup unit to mix it with at least one brew ingredient contained therein, making a ready-to-drink heated/cooled beverage.

The invention further provides a beverage preparation system comprising:
  a beverage preparation device connected to a power source;
  a cup unit insertable onto a holding tray partially disposed within the beverage preparation device, such cup unit having a potable liquid and at least one beverage brewing element with at least one brewing ingredient therein for preparing a brewed drink;
  means for extracting the potable liquid from the cup unit;
  means for processing the potable liquid; and
  means for returning the potable liquid into the cup unit to mix with the at least one brewing ingredient, making a ready-to-drink heated/cooled beverage.

There is also provided a beverage preparation method comprising the steps of:
  providing a beverage preparation device connected to a power source;
  providing a cup unit insertable into the beverage preparation device, such cup unit having a potable liquid and at least one beverage brewing element with at least one brewing ingredient therein for preparing a brewed drink;
  extracting the potable liquid from the cup unit;
  processing the potable liquid; and
  returning the potable liquid into the cup unit to mix with the at least one brewing ingredient, making a ready-to-drink heated/cooled beverage.

In a preferred embodiment of the invention, the cup unit is provided containing a potable liquid, such as water, in a sealed, multi-laminated bag, and at least one capsular brewing element (hereinafter referred to simply as a brewing element), comprising one or more ingredients for preparing a brew, such as, for example, ground coffee beans.

The brewing element within the cup is constructed so as to be shaped to contain edible ingredients and retain its integrity even under pressure such as that needed for espresso drink preparation, but not by any external support.

In contrast, prior art capsular brewing elements having axial flow are tightly supported in a very rigid chamber for two reasons: 1) axial flow brewing elements need to be sealed at both sides (both faces) to prevent any leakage while high pressure hot water flows through these capsules. 2) Since face-to-face high pressure is used for sealing, axial flow brewing elements tend to collapse and blow out to the shape of a barrel. Thus, axial flow type brewing elements in capsular form are tightly supported along their entire envelope.

The force needed to support the brewing element of the present invention is only about 1/50 of the force needed to support prior art axial flow type capsular brewing elements. In numerical value, the axial force needed to support the brewing element of the current invention is about 2 kg (local support, and without any support to the capsule envelope) compared to about 100 kg for prior art axial flow type capsular brewing elements.

Although in a preferred embodiment of the present invention the brewing element is torroidal-shaped, other shapes may be used which can withstand the pressure applied by the forced entry of hot water into the brewing element during espresso preparation. Such shapes are suitable for use in accordance with the principles of the present invention since they do not require external support. For example, in another embodiment of the present invention, the brewing element is configured in a volleyball-shape, that is, in a generally spherical form (see FIG. 4), so as to retain its shape when subject to the high pressure needed in preparing an espresso drink.

In a preferred embodiment of the present invention, the brewing element is made from polypropylene, but other materials, known to those skilled in the art, may also be used.

The espresso point device is suitable for use by drivers and passengers in private cars, in taxis, in trucks and buses and other vehicles where it may be mounted on a dashboard, much as cigarette lighters or DVD players are mounted today.

In mobile home trailers, the espresso point device may be provided as an accessory to the kitchen facility, much as a built-in microwave oven. It may also be located in restaurants, diners, or public and private areas, including gas stations, public institutions, schools, offices and businesses and in shopping strips and shopping malls. In the latter examples, a user would purchase the drinking cup of the invention, or bring one from home, to the espresso point device at the nearest espresso point device location and, as a courtesy service, is provided with drink preparation service at no further charge.

The espresso point device optionally provides additional ingredients to add to the drink, such as sweeteners, flavors, or $CO_2$ for producing cold soda water.

BRIEF DESCRIPTION OF THE DRAWINGS

For a better understanding of the present invention with regard to the embodiments thereof, reference is made to the accompanying drawings, not to scale, in which like numerals and letters designate corresponding elements or sections throughout, and wherein.

DETAILED DESCRIPTION OF THE PREFERRED EMBODIMENTS

Figure 1:
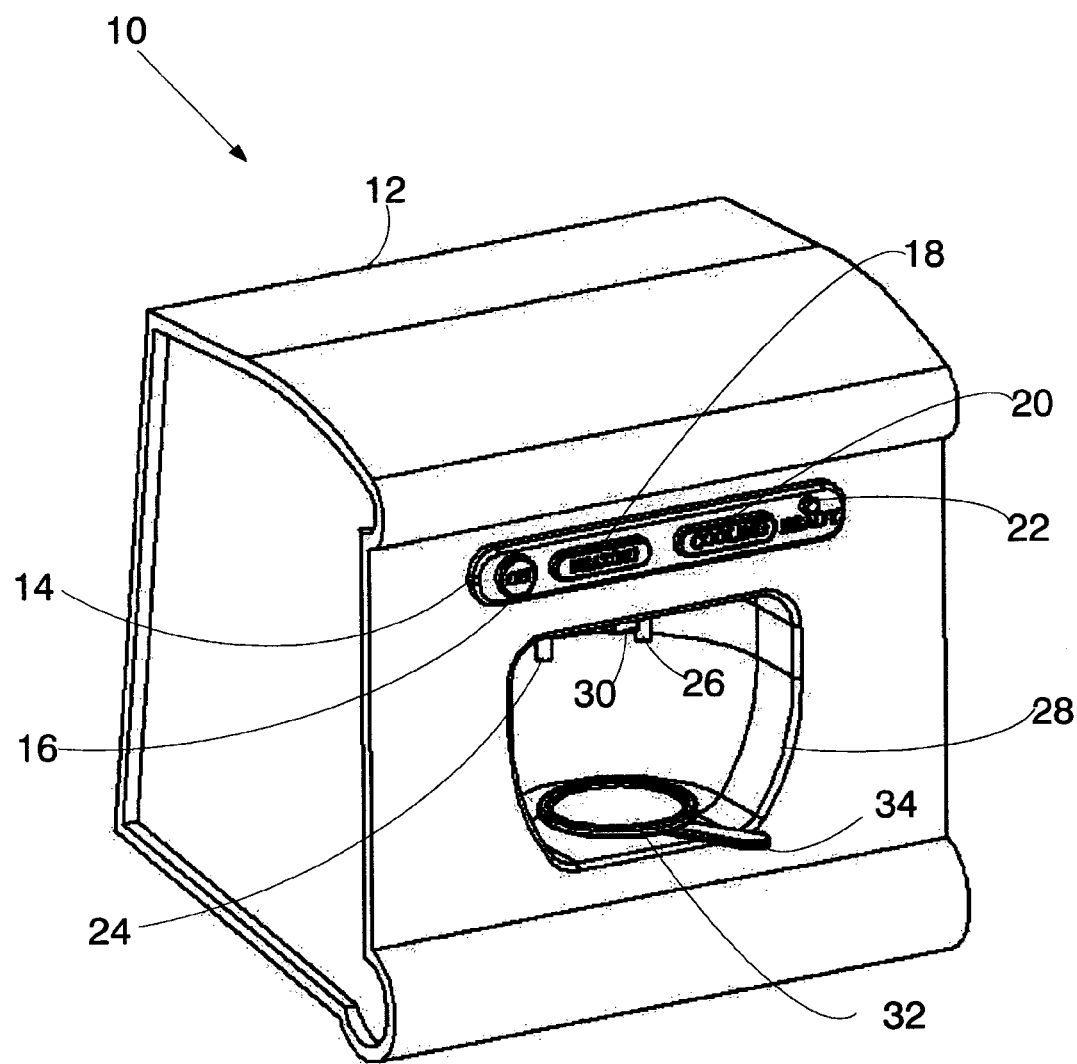
FIG. 1 is an isometric view of a beverage preparation device constructed in accordance with a preferred embodiment of the invention and in a disengaged mode.

FIG. 1 is an isometric view of a beverage preparation device constructed in accordance with a preferred embodiment of the invention and in a disengaged mode.

The espresso point device 10 is shown, by way of example, as a built-in segment of a vehicle dashboard 12. Espresso point device 10 comprises a control panel 14 including, in a preferred embodiment of the invention, a start button 16 marked "ON", a heating button 18, a cooling button 20, and an indicator light 22 marked "READY". A plate-like seat 32 is provided as a convenient holding platform for a cup unit (see FIG. 2). It is raised by action of lever 34 in the direction of the arrow to lift the cup unit so as to engage with espresso point device 10.

In a preferred embodiment of the present invention, at least two tubes 24, 26 are provided for operation of the system when a cup unit 36 (see FIG. 2) is introduced into receiving chamber 28 and engaged with espresso point device 10. Extraction tube 24 is provided for extracting a potable liquid, such as water, from the cup unit and return inlet tube 26 returns the processed liquid to the cup unit either heated or cooled, as selected by a user from control panel 14.

In a preferred embodiment of the present invention, a bar code reader 30 is provided for reading a preprogrammed bar code strip 44 marked on the cover of cup unit 36 (see FIG. 2) when it is inserted into receiving chamber 28 and espresso point device 10 is operated.

Figure 2:
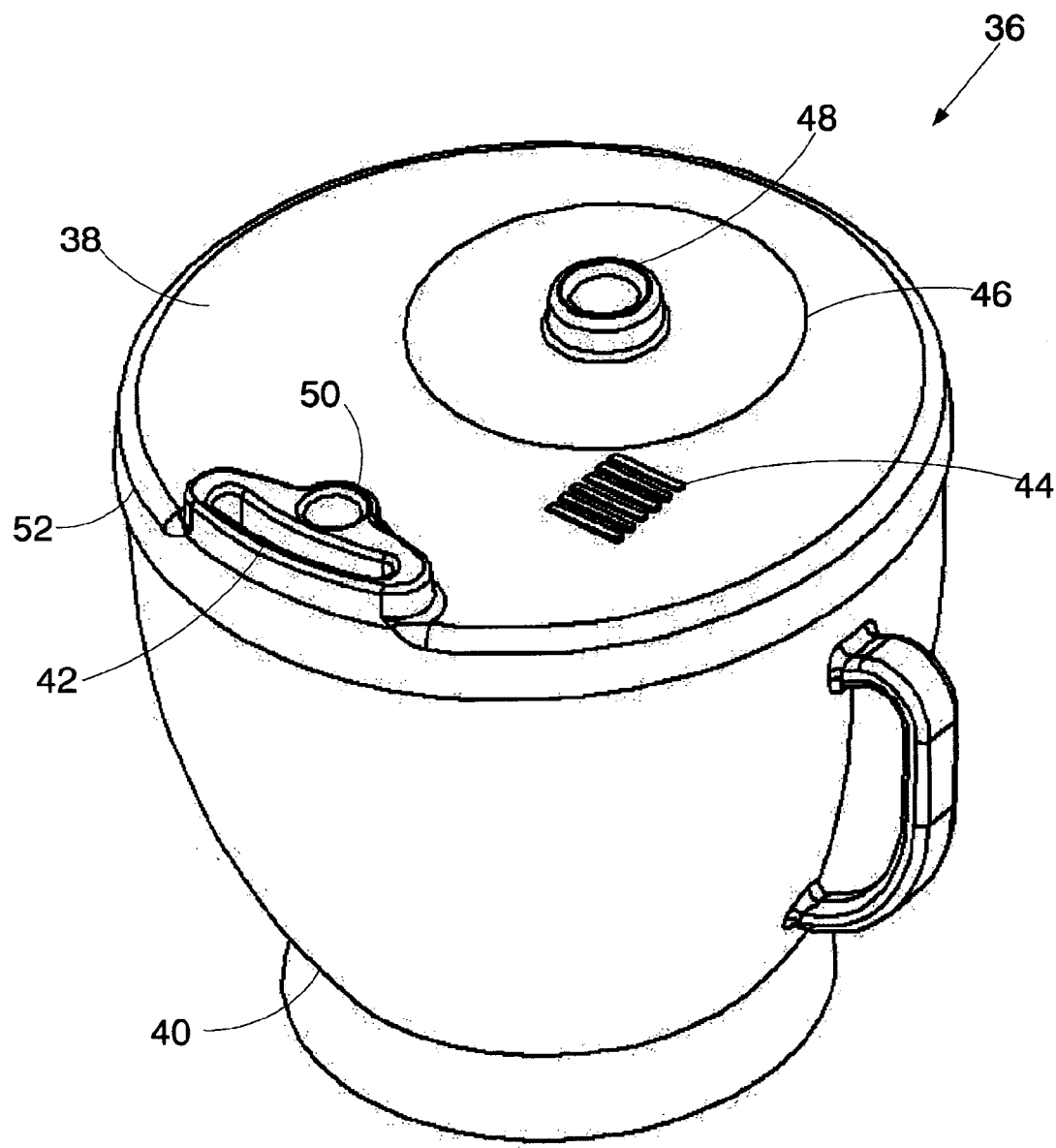
FIG. 2 is an isometric view of a cup unit constructed in accordance with a preferred embodiment of the invention.

FIG. 2 is an isometric view of a cup unit constructed in accordance with a preferred embodiment of the invention. Cup unit 36 comprises the body of a drinking cup 40 having a cup cover 38 sealed thereon at seal 52 and having a built-in capsule brewing element 46 (shown in detail in FIGS. 3 and 4). Cup cover 38 is provided with a mouthpiece 42 for drinking from cup unit 36. In a preferred embodiment of the present invention, a bar code strip 44 is affixed to cover 38 for providing operating instructions for operating the espresso point device 10 (see FIG. 1) and automatically processing a brew.

Alternatively, smart chips (not shown) embedded in cup cover 38 may implement, in combination with various types of sensors as are known to those skilled in the art, electronic, optical, or software-based instructions for the operation of the espresso point device 10.

In a preferred embodiment of the invention, at least two utility ports 48, 50 are formed in cover 38. Inlet port 48 is disposed over capsule brewing element 46 so as to provide for direct mixing of the potable liquid returned to cup 40 after having been processed in espresso point device 10 (see FIG. 1). Extraction port 50 serves as both an air hole to allow easy flow of the drink from cup 40 and as a port for transferring, by suction action, the potable liquid to be processed in espresso point device 10 when operated. Mouthpiece 42 is provided for conveniently sipping the prepared brew.

Alternatively, a user is provided with cold water or soda water returned to the cup unit 36 to make, respectively, a cold drink or a carbonated beverage.

Figure 3:
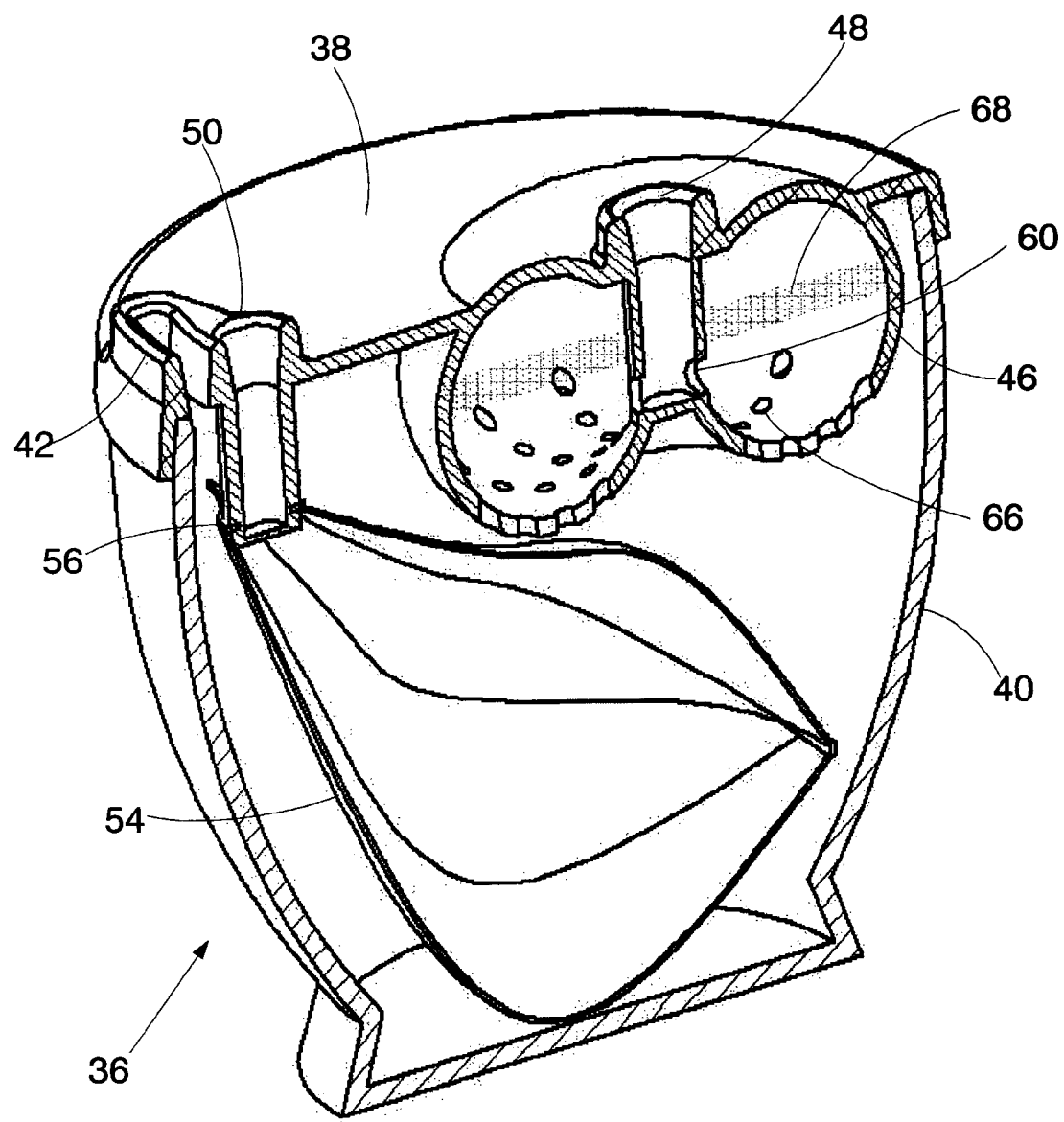
FIG. 3 is a cross-section, detailed view of the cup unit of FIG. 2.

FIG. 3 is a cross-section, detailed view of the cup unit of FIG. 2. Cup unit 36 comprises a drinking cup 40 and a cup cover 38 sealed thereon and fitted, in a preferred embodiment of the invention, with a torroidal-like capsule brewing element 46. A multi-laminated bag 54 is provided within drinking cup 40 to hold a potable liquid (not shown), such as water, for preparation of a drink and is sealed with a thin, aluminum membrane 56. When cup unit 36 is inserted into the receiving chamber 28 of espresso point device 10 (see FIG. 1), tube 24 (see FIG. 1) punctures aluminum membrane 56 so as to allow the potable liquid in multi-laminated bag 54 to be extracted. The potable liquid stored therein is isolated from the capsule brewing element 46 which holds dry brew ingredients 68, such as ground coffee for making an espresso drink.

Cover 38 is provided with at least two openings, extraction port 50 and inlet port 48 as explained heretofore in respect to FIG. 2. Inlet port 48 is provided so as to allow return of the processed potable liquid from espresso point device 10 into capsule brewing element 46 where it is directed by lateral inlet holes 60 to mix with the dry ingredients 68 contained therein and produces a mixed brew which is forced through small outlet holes 66 to disperse into cup 40. The prepared brew is then ready to drink from mouthpiece 42.

The laminations of bag 54 are made, for example, with layers of polyethylene, polyamide, aluminum foil, and/or polyester materials. The aluminum layer is the most important layer since it serves to isolate the potable liquid from the dry ingredients 68 in capsule brewing element 46. Bag 54 is collapsible to almost zero volume as the potable liquid is sucked out. This causes an enlargement of the volume of cup 40 to provide for sufficient space for the return from espresso point device 10 of the processed potable liquid.

Figure 4:
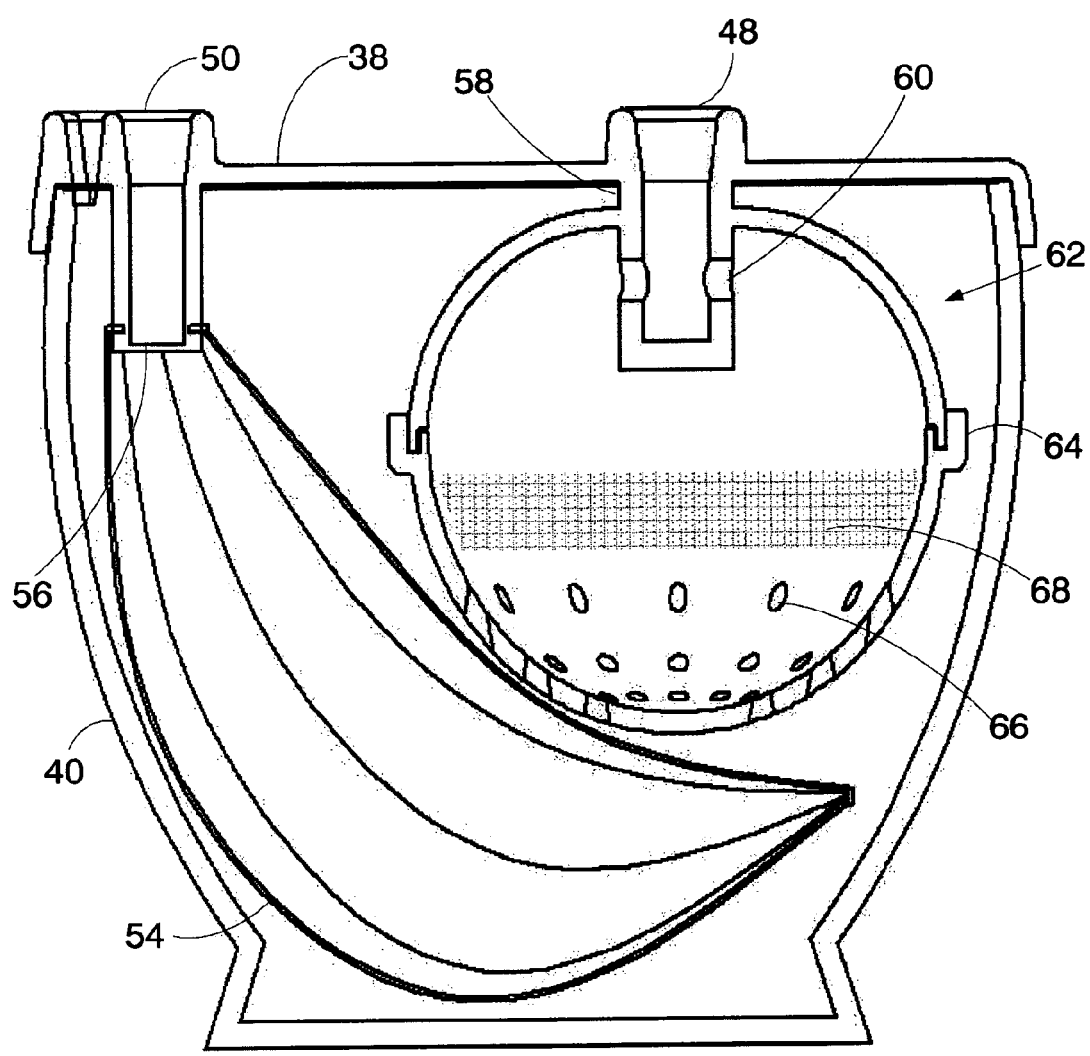
FIG. 4 is a cross-section view of another embodiment of the present invention.

FIG. 4 is a cross-section view of another embodiment of the present invention wherein the capsule brewing element is shaped like a spherical chamber held in place with only minimal external support.

Notice that brewing element 62 in drinking cup 40 is shaped in the form of a spherical chamber and held in place with only minimal external support at capsule neck 58 which is attached to inlet port 48 formed in cup cover 38. Capsule brewing element 62 is configured in a shape much like that of a volleyball, but very small and inflated through a small valve (not shown). Such a thin envelope can hold the internal pressure necessary to keep the volley-ball-like shape inflated and without using any or with only minimal external support.

Capsule brewing element 62 stores dry ingredients 68 to make a brew and is shown, by way of example, formed of two halves joined at a seam 64. Seam 64, in a preferred embodiment of the invention, is formed using an ultrasonic weld. Alternatively, the seal at seam 64 may be a snap type, thread connection or formed of any connection known to those skilled in the art. Outlet holes 66 are provided in multiple locations around the bottom and sides of the lower half of the spherical brewing element 62 for releasing the mixed brew, ready for drinking, into cup 40.

The inlet tube 48 to the volleyball-shaped brewing element 62 has a very small diameter which is sufficient for the purpose of admitting water into the brewing element 62. The thin membrane walls of the volleyball-shaped brewing element 62 may be configured as a single, spherical surface, or may be configured as a number of segments joined at the poles of the spherical surface, much like the form of a tangerine fruit.

Figure 5:
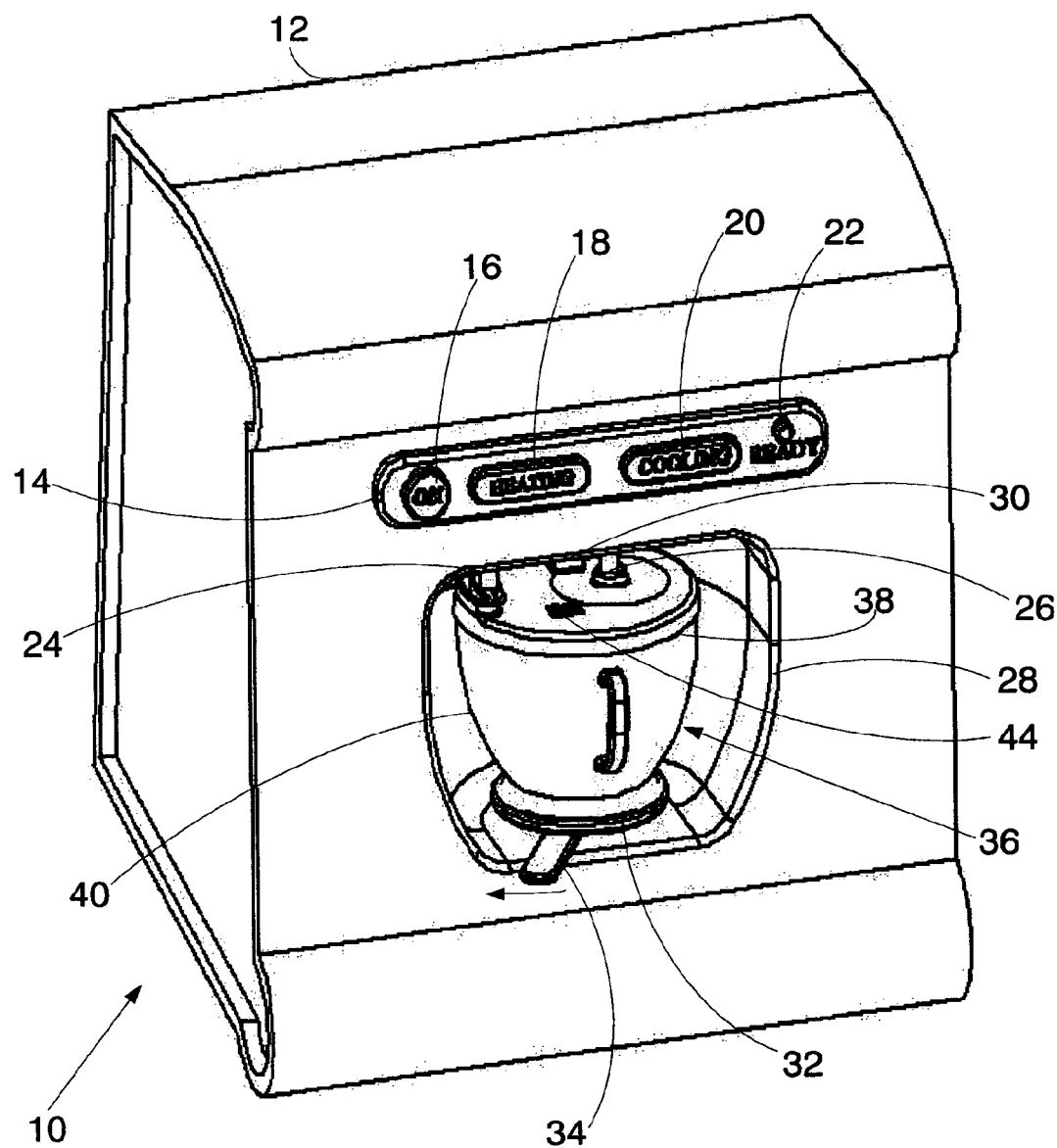
FIG. 5 is an isometric view of the beverage preparation device of FIG. 1 in an engaged mode.

FIG. 5 is an isometric view of the espresso point device of FIG. 1 in an engaged mode. There is shown a cup unit 36 placed in espresso point device 10. Lever 34 is shown moved as indicated by the arrow so as to lift the platform 32 and engage ports 48, 50, (see FIG. 2) on the cover 38 of cup unit 36 with their corresponding tubes 24, 26 in espresso point device 10.

The method of operation of espresso point device 10 comprises the steps of placing a cup unit 36 in receiving chamber 28, moving lever 34 so as to raise platform 32 and thus engage cup unit 36 with espresso point device 10, pressing the ON button 16 in control panel 14, and removing cup unit 36 from receiving chamber 28 when espresso point device 10 signals that the brewed drink is READY as indicated by indicator light 22. The espresso point device 10 operates autonomously when bar code 44 on cup unit 36 is read by bar code reader 30 which recognizes the type of drink ingredients contained in the specific capsule brewing element of the cup unit 36 selected by a user, and activates control unit 70 which operates to prepare that drink. Among the parameters preprogrammed, in a preferred embodiment of the invention, are those such as whether the drink preparation requires heating or cooling; high or low pressure; and duration time. Other parameters, of course, can easily be configured for activation by the operation of the espresso point device 10 when a suitable bar code 44 is marked on cup unit 36 or other means are used to provide a source for instructions.

Figure 6:
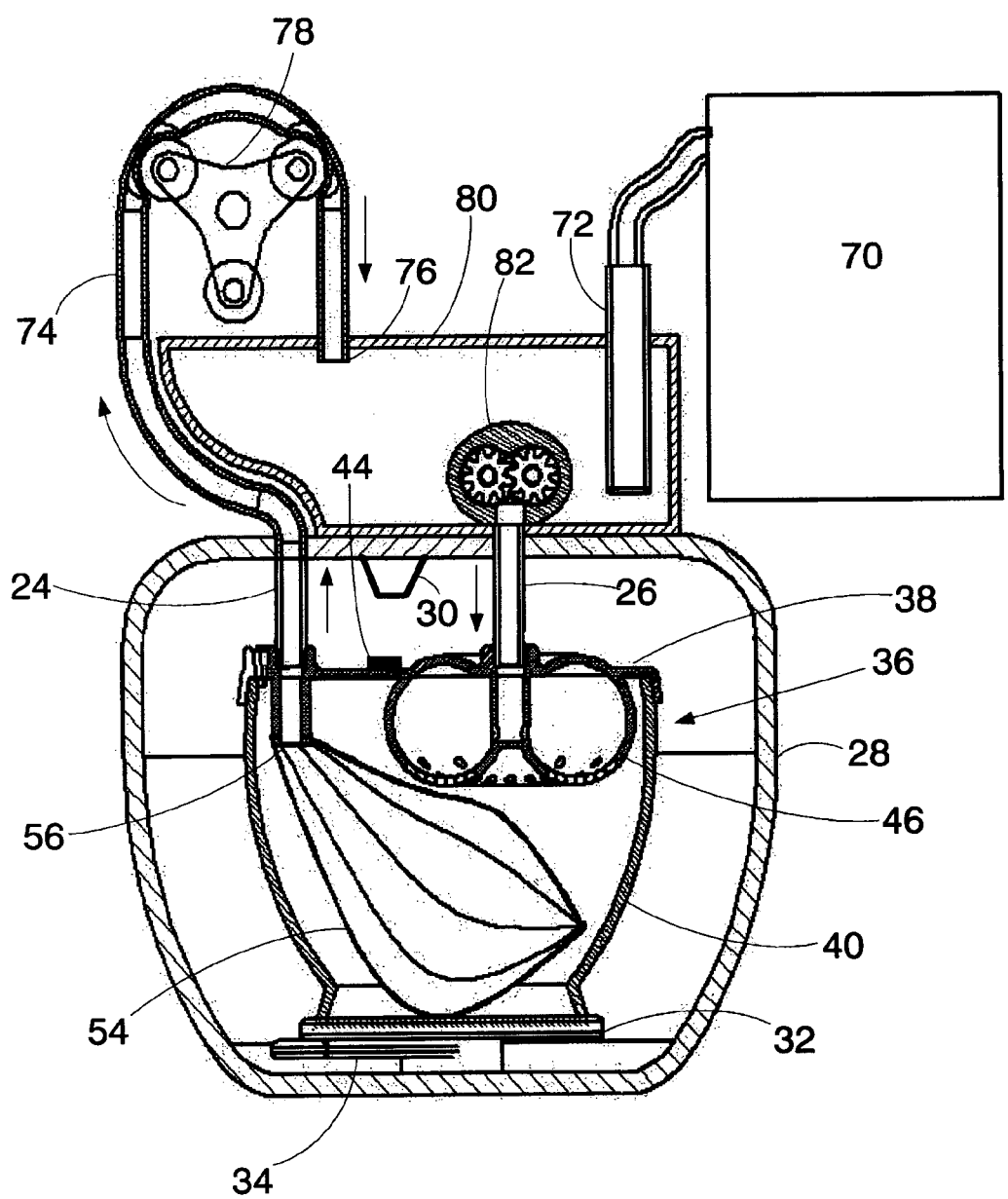
FIG. 6 is a side, cross-sectional view of the operating components of the system of the invention of FIG. 5.

FIG. 6 is a side, cross-sectional view of the operating components of the system of the invention of FIG. 5. Espresso point device 10 is shown with cup unit 36 placed in chamber 28 and engaged with extraction tube 24 and return inlet tube 26. A peristaltic pump 78 provides the suction action to draw a potable liquid, such as water, out of laminated bag 54 in cup unit 36. The water is pumped through pump outlet tube 76 into heating/cooling chamber 80 where a heating/cooling element 72, controlled by control unit 70, heats or cools the water in accordance with preprogrammed instructions read by an information source. In a preferred embodiment of the present invention, this information source comprises encoded instructions within a bar code strip 44 marked on cover 38 and a bar code reader 30.

A smaller, second pump, such as mitered gear pump 82, returns the processed water through return inlet tube 26 into capsule brewing element 46. Alternatively, a solenoid or other small pump can be employed in place of mitered gear pump 82. The mixed brew from capsule brewing element 46 then passes into cup 40. Cup unit 36 is then disengaged from espresso point device 10 by returning lever 34 into the disengaged mode and the prepared brew is ready to drink.

In operation, the device, preferably uses an extraction means, such as a suction pump 78 connected by an extraction tube 24 inserted into a port 50 (see FIG. 2) formed on the cup cover 38 to withdraw the potable liquid, such as water, provided in the cup unit 36; processes, i.e., heats/cools the potable liquid to a predetermined temperature in a heating/cooling chamber 80; and then utilizes a return means, such as a second pump 82 connected by an inlet tube 26 to a port 48 formed in the cup cover 38, to return the heated or cooled potable liquid back into the cup unit 36 so that the processed potable liquid mixes with the edible ingredients 68 (FIG. 3) within a brewing element 46. The brewing element 46 is configured with the cup cover 38 and disposed beneath the inlet tube 48 so as to produce a selected drink when the processed potable liquid passes through the brewing element. 46

The action of the espresso point device 10 may be set at a predetermined pressure, such as high or low, in order to produce an espresso type drink, tea, or even plain hot or cold water without adding any edible ingredients. The user selects a cup unit 36 with the type of drink preferred, such as espresso, and the bar code strip 44 on the cup cover 38 is read by a bar code reader 30 on the espresso point device 10 which then proceeds to activate either a heating element 72 in the power unit 80 to produce a hot potable liquid, or via a cooling unit (not shown) to prepare a cold drink, in each case with the operating cycle controlled per the bar code strip instructions.

The potable liquid for the drink, generally water, is confined in a flexible and collapsible bag 54 made of laminated materials, including aluminum foil, in a preferred embodiment of the present invention. Bag 54 is totally sealed to isolate the wet from the dry ingredients within the cup unit 36 and is punctured when the extraction tube 24 is inserted into its respective opening in the cup cover 38 when the cup unit 36 is placed on platform 32 and engaged with an espresso point device 10 (FIG. 1) by operating lever 34.

In another embodiment of the invention, in addition to the tube connections, the espresso point device is provided with electrical connections such as for controlling the operation of the espresso point device, such as for regulating heating and cooling, introducing carbonation, adding sweeteners to a drink, and the like.

Figure 7:
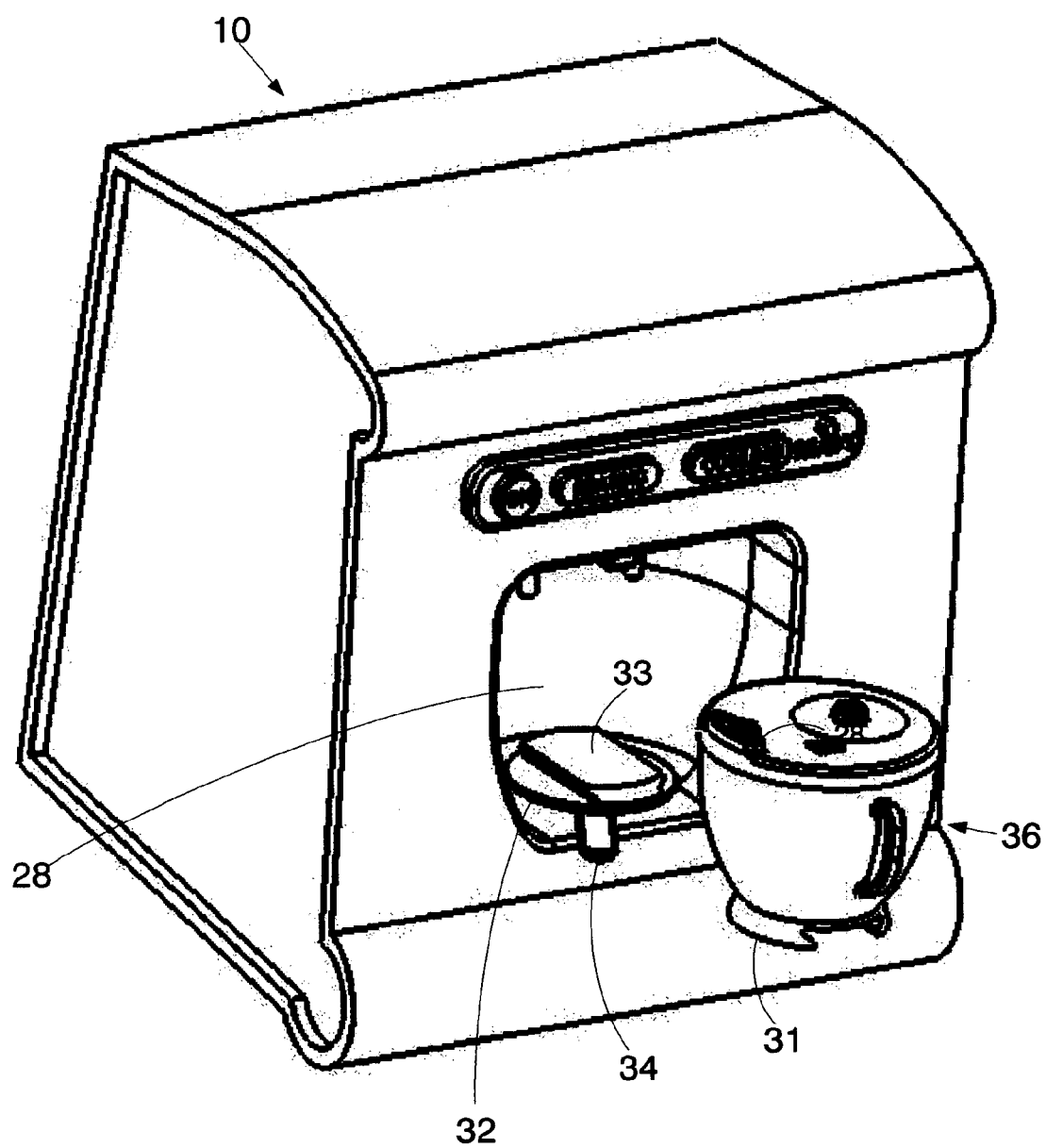
FIG. 7 is a view of the beverage preparation device from FIG. 1 shown with a cup unit being inserted therein, the cup having an articulated quick-release means formed in its base in accordance with the principles of the present invention.

FIG. 7 is a view of the beverage preparation device of FIG. 1 shown with a cup unit 36 being inserted into the receiving chamber 28 of the beverage preparation device 10. The cup unit 36 has an articulated quick-release means 31 which comprises a dove-tailed configuration formed at the base of cup unit 36 for conveniently 'locking" the cup unit 36 in an upright position on a holding tray 13, so as to maintain alignment with the at least two tubes 24, 26 (see FIG. 1) connecting it to a power unit (not shown). The tubes 24, 26 are automatically inserted into corresponding openings 48, 50 (see FIG. 2) in the cup cover 38 when lever 34 is lightly rotated. Corresponding with this quick-release means 31 is a flat-surfaced flange 33 formed on holding tray 33 within chamber 28 of espresso point device 10 which tightly dove-tails with quick-release means 31.

Figure 8:
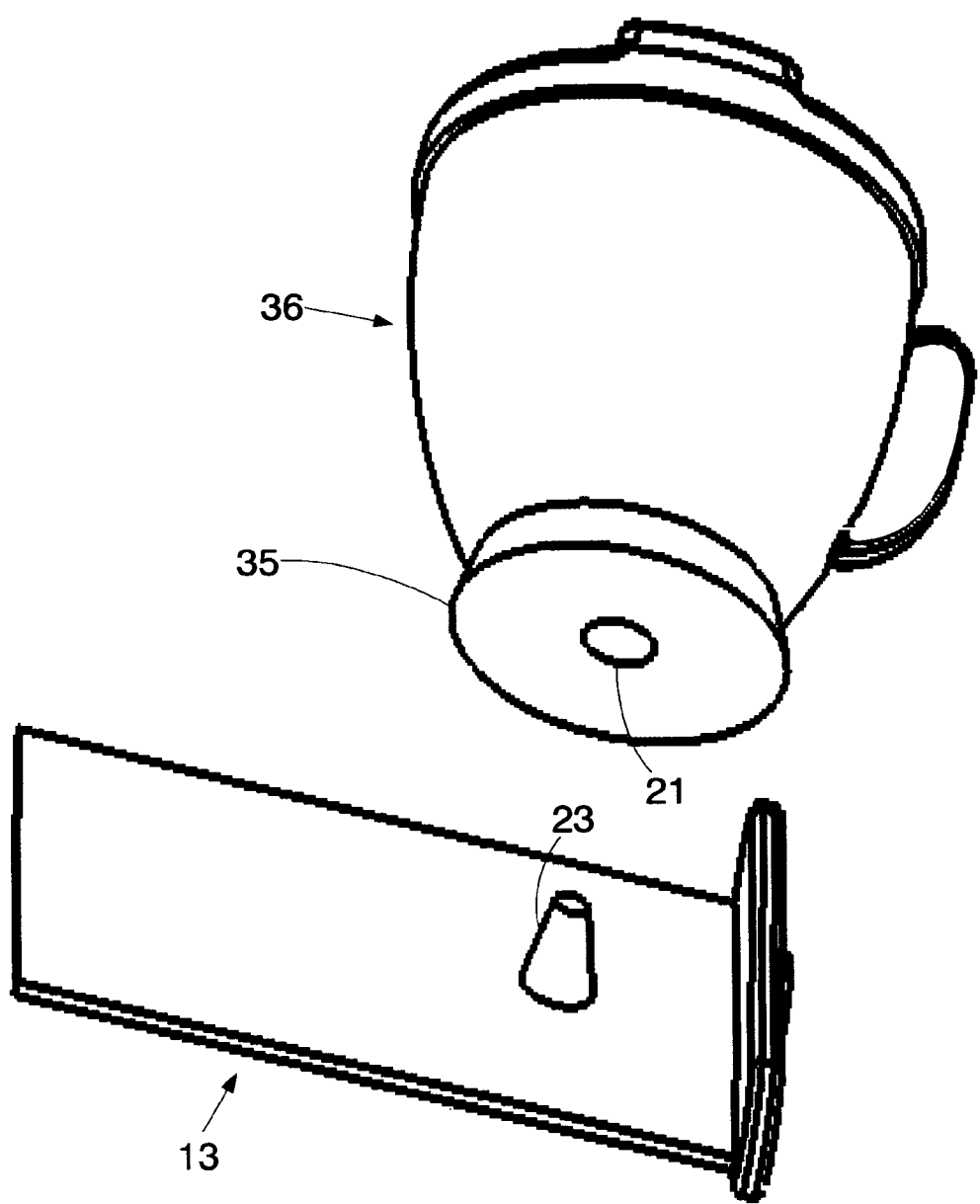
FIG. 8 is an isometric view of a cup unit shown being placed on a holding tray.

FIG. 8 is an isometric view of cup unit 36 shown being placed on holding tray 13. In a preferred embodiment of the present invention, retractable holding tray 13 is formed so that a cup unit 36 can be conveniently and securely placed into the receiving chamber 28 (see FIG. 7) and safely removed if filled with a hot brew. Cup unit 36 is formed with a base 35 having a hollowed inverse cone 21 formed in its center which corresponds and is compatible with a conical protrusion 23 formed on retractable holding tray 13. When light pressure is applied to cup unit 36 when it is seated on the conical protrusion 23, cup unit 36 is securely locked in position on holding tray 13 within receiving chamber 28 (as shown in FIG. 5).

Figure 9:
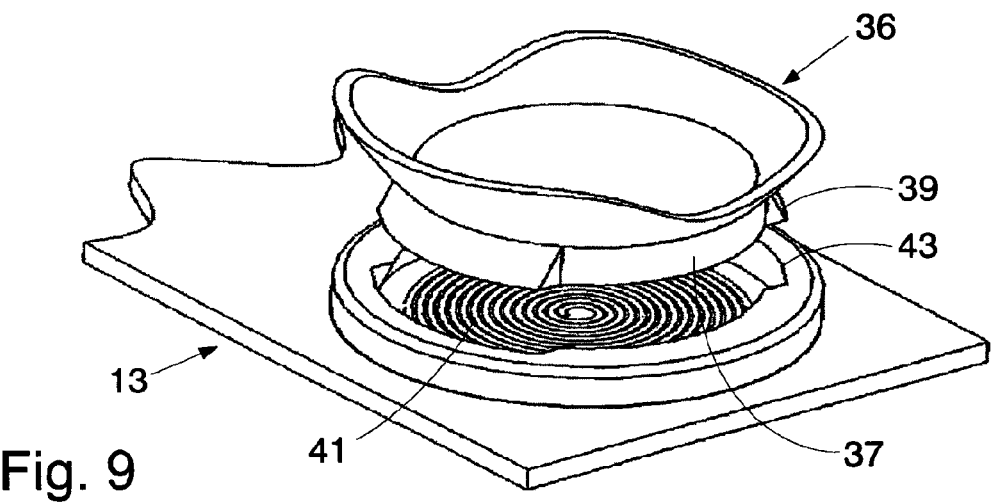
FIG. 9 is a partial, cut-away view of a cup with an articulated quick-release means formed in its base being placed in position on a heating element in accordance with yet another embodiment of the present invention.

FIG. 9 is a partial, cut-away view of a cup unit 36 with another type of articulated quick-release means formed in its base 37 shown being placed in position on a heating element 41 in accordance with yet another embodiment of the present invention. When the heating element 41 is operated, it quickly reheats the potable liquid in the cup unit 36. This is especially advantageous when a user has not had a chance to drink the brew immediately after its preparation in the espresso point device 28. Cup base 37 is formed with an articulated quick-release means 39 which corresponds to feature 43 on tray 13. A quarter-turn rotation of cup unit 36 securely locks it into position on heating element 41.

Figure 10A:
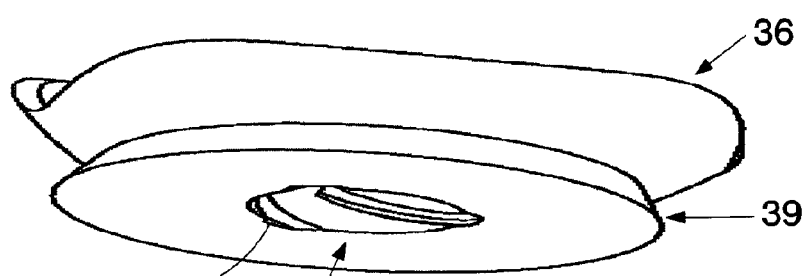
FIGS. 10A and 10B show partial cut-away views of an alternative embodiment of the articulated quick-release means of the present invention.
Figure 10B:
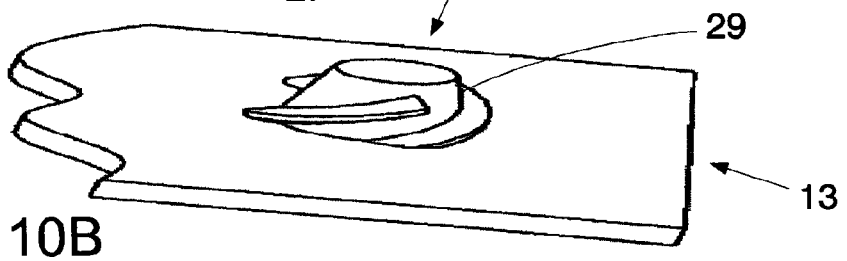

FIGS. 10A and 10B show partial cut-away views of yet another embodiment of the articulated quick-release means of the present invention. Cup unit 36 is formed with a cup base 39 having a threaded hollow 27 corresponding to a conical, threaded protrusion 29 formed on retractable holding tray 13. Holding tray 13 can be pulled out from receiving chamber 28 (see FIG. 7) to more conveniently attach cup unit 36 to holding tray 13. A quarter-turn rotation of cup unit 36 serves to securely attach it to conical protrusion 29 on the retractable holding tray.

Figure 11:
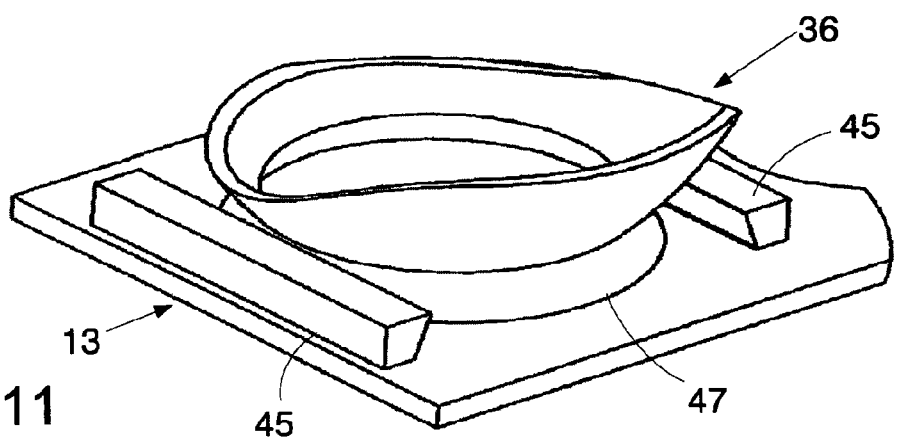
FIG. 11 shows a partial, cut-away view of yet another embodiment of the quick-release means of the present invention.

FIG. 11 shows a partial, cut-away view of yet another embodiment of the quick-release means of the present invention. Cup unit 36 is shown provided with a base 47 formed in such a way as to follow the contours of parallel tracks 45 which "hug" cup base 47 and retain it securely on retractable holding tray 13. Parallel tracks 45 are formed so that the distance between them is smaller at their upper edge than at their lower edge on their inward-facing sides, thus providing a tongue and groove type slide in relation to the base 47 of cup unit 36.

Having described the present invention with regard to certain specific embodiments thereof, it is to be understood that the description is not meant as a limitation, since further modifications may now suggest themselves to those skilled in the art, and it is intended to cover such modifications as fall within the scope of the appended claims.

The invention claimed is:

1. A beverage preparation device comprising:
   a housing formed with a receiving chamber partially surrounding a holding tray provided with a quick-release means;
   a cup unit comprising a drinking cup having a base formed with matching quick-release means,
   a collapsible bag disposed within said drinking cup for holding said potable liquid isolated from said at least one capsule brewing element; and
   a cup cover sealed to said drinking cup,
   said cup unit being provided with a potable liquid and at least one capsule brewing element contained therein for preparing a brewed drink;
   a first pump connected to said cup unit;
   a means for heating/cooling said potable liquid; and
   a second pump connected to said cup unit,
   such that when said cup unit is engaged in place on said holding tray via said matching quick-release means and disposed within said receiving chamber, said first pump extracts said potable liquid from said cup unit when in fluid communication therewith, said means for heating/cooling heats/cools said potable liquid until reaching a selected temperature level suitable for said brewed drink, and said second pump, when in fluid communication with said heating/cooling means and said cup unit, returns said potable liquid into said cup unit to mix directly with at least one brew ingredient contained within said at least one capsule brewing element, making a ready-to-drink heated/cooled beverage within said cup unit.

2. The beverage preparation device of claim 1, wherein said housing comprises a built-in segment of a vehicle dashboard having electrical connectivity to a vehicular power supply for providing power to said beverage preparation device.

3. The beverage preparation device of claim 2, wherein said electrical connectivity comprises connection to a cigarette lighter connector.

4. The beverage preparation device of claim 1, wherein said holding tray is retractable inward into said receiving chamber and extendable outward therefrom.

5. The beverage preparation device of claim 1, wherein said quick-release means in said holding tray matches an inverse, articulated connector formed in said cup unit.

6. The beverage preparation device of claim 5, wherein said articulated connector comprises a system for removably joining said cup unit to said holding tray, said system being selected from at least one of the group: a conical hollow joining a conical protrusion; a bayonet-type connector joining a scabbard-type receptor; and a dove-tail connector.

7. The beverage preparation device of claim 1, wherein said cup unit further comprises an instruction source having encoded information in the form of a bar code strip applied thereto and readable by a bar code reader disposed within said receiving chamber.

8. The beverage preparation device of claim 7, wherein said encoded information comprises pre-programmed instructions for operating said beverage preparation device.

9. The beverage preparation system of claim 8, wherein said preprogrammed instructions are select instructions related to parameters chosen from the following group: heating, cooling, high pressure, low pressure, and time duration of operation.

10. The beverage preparation device of claim 1, wherein said base is formed with flanges so as to be slidably insertable into a matching configuration formed on said holding tray to retain said cup unit in a predetermined orientation and fixed position thereon.

11. The beverage preparation device of claim 1, wherein said holding tray is formed with a heating/cooling element to reheat/cool the potable liquid in said cup unit when placed thereon and said heating/cooling element is connected to a power source and operated.

12. A beverage preparation system comprising:
   a beverage preparation device connectable to a power source, said beverage preparation device comprising a housing formed with a receiving chamber partially surrounding a holding tray provided with a quick-release means;
   a cup unit comprising a drinking cup having a base formed with matching quick-release means, said cup unit being provided with a potable liquid and at least one capsule brewing element with at least one brewing ingredient therein for preparing a brewed drink;
   a first pump connected to said cup unit;
   a means for heating/cooling said potable liquid; and
   a second pump connected to said cup unit,
   such that when said cup unit is engaged in place on said holding tray via said matching quick-release means and disposed within said receiving chamber, said first pump extracts said potable liquid from said cup unit when in fluid communication therewith, said means for heating/cooling heats/cools said potable liquid until reaching a selected temperature level suitable for drinking, and said second pump, when in fluid communication with said heating/cooling means and said cup unit, returns said potable liquid into said cup unit to mix directly with at least one brew ingredient contained within said at least one capsule brewing element, making a ready-to-drink heated/cooled beverage within said cup unit.

13. The beverage preparation system of claim 12, wherein said at least one capsule brewing element is formed so as to withstand the internal pressure applied by forced entry of hot water thereinto during espresso preparation with only negligible external support.

14. The beverage preparation system of claim 12, wherein said at least one capsule brewing element is torroidal-shaped.

15. A method for preparing a brewed drink comprising the steps of:
   a) providing an espresso machine comprising:
      a receiving chamber having a holding tray for seating and servicing drinking cups;
      at least a first pump for extracting potable water from a cup unit to bring it into contact with a heating/cooling means disposed in a heating/cooling chamber for heating/cooling said potable liquid to a preselected temperature utilizing the Peltier principle;
      a second pump for returning said potable water under pressure into said capsule brewing element;
      a control panel disposed on the face of said espresso machine for selection of predetermined control factors for brew preparation;
   b) providing an individual drinking cup unit insertable into said receiving chamber;
   c) dispersing the finished brew within said cup unit to make a ready-to-drink heated/cooled beverage within said cup unit.

* * * * *